United States Patent [19]

Ebener, Jr.

[11] 4,255,026
[45] Mar. 10, 1981

[54] VIEWER

[76] Inventor: Warren R. Ebener, Jr., 1616 Terrace View Dr., West Columbia, S.C. 29169

[21] Appl. No.: 107,410

[22] Filed: Dec. 26, 1979

[51] Int. Cl.³ .................. G03B 23/12; G03B 1/58; G03B 21/02
[52] U.S. Cl. .................. 353/26 R; 242/180; 242/181; 352/78 R; 353/108; 353/DIG. 2
[58] Field of Search ............... 353/108, DIG. 2, 26 R; 352/78 R; 242/180, 181

[56] References Cited

U.S. PATENT DOCUMENTS

| 3,480,354 | 11/1969 | Fukuda | 242/180 |
| 3,679,298 | 7/1972 | Knowles et al. | 352/72 |
| 3,690,751 | 9/1972 | Von Fischern et al. | 242/181 |
| 3,992,088 | 11/1976 | Blanke | 353/26 R |
| 4,076,397 | 2/1978 | Becker | 353/26 R |

FOREIGN PATENT DOCUMENTS

479749  7/1929  Fed. Rep. of Germany .... 353/DIG. 2

*Primary Examiner*—Steven L. Stephan
*Attorney, Agent, or Firm*—Larry Harold Kline

[57] ABSTRACT

A device is disclosed for use by a person for viewing material on film in a cartridge comprising a viewing screen, a projection module, a cartridge module, a lens system, a gear system for advancing the film, and a gear system for reversing the film.

10 Claims, 20 Drawing Figures

VIEWER

This invention relates to a viewer and more particularly to a viewer which can be utilized for cartridges. Many invalids, children, and normal adults can utilize a simple viewing device for purposes of viewing books, magazines, newspapers, and other printed material.

The present invention enables these persons to utilize a simple viewer utilizing a durable, inexpensive viewer with a simply operated forward and reverse system.

An object of the present invention is to provide a viewer in which the forward and reverse operations can be simply accomplished.

Another object of this invention is to provide a viewer which is durable, inexpensive and portable.

Still another object of this invention is to provide a viewer with easily moldable parts, easy maintenance, and utilizing an ordinary light bulb.

A further object of this invention is to provide a viewer which can be easily read and in which the viewing screen has appropriate light for reading in a larger than ordinary book type print.

A further object of this invention is a conservation of paper and materials for providing reading material in cartridge form which can be stored in a smaller area than in paper form.

Still another object of this invention is to provide a viewer which can be easily utilized by invalids or children.

A further object of the invention is to provide a viewer with the unique features of a knob which can be push-pulled or turned without manual dexterity.

Another object of the invention is to provide a viewer with a projection module, a rewind module and a storage module.

Still another object of this invention is to provide a cartridge which can be removed without manual dexterity and comprises tension springs and gears and film guides.

A further object of the invention is to provide a cartridge rewind system which utilizes energy stored in a spring assembly.

These and other objects and features of the invention will be apparent from the following description and appended claims.

Briefly, the invention is a device for use by a person for viewing material on film in a cartridge. A viewing screen is secured within the device. A projection module is secured within the device. A cartridge module is operable to hold the cartridge. The cartridge module is optically alligned with the projection module and is secured to the device. Lens means is secured to the device. The lens means is optically alligned with the projection module and the cartridge module. The lens means is operable to focus the material on to the viewing screen. First gear means is secured to the cartridge. The first gear means is operative, when moved, to advance the film in the cartridge. A second gear means is secured to the cartridge. The second gear means is operative, when moved, to reverse the film in the cartridge. Third gear means is secured within the cartridge module. The third gear means is operative, when moved, to move the first gear means thereby advancing the film. Fourth gear means is secured within the cartridge module. The fourth gear means is operative, when moved, to move the second gear means thereby reversing the film in the cartridge. First gear moving means is positioned within the device. The first gear moving means is operative to move the third gear means thereby advancing the film when activated by the person. Second gear moving means is positioned within the device. The second gear moving means is operative to move the fourth gear means, thereby reversing the film, when activated by the person.

The device further comprises a cartridge rewind module, which is secured within the device. The cartridge rewind module is operative to rewind the film in the cartridge. The device further comprises a cartridge storage module secured within the device. The cartridge storage module is operative to store the cartridge or similar cartridges when not in use. The first gear moving means comprises an advance control rod and an advance button secured to the end of the advance control rod which can be utilized by the person to activate the first gear moving means. An advance piece with gear teeth is secured onto the advance control rod. The advance piece is operative to mesh with the third gear means. An advance adjustment means is operative to adjust the extent of movement of the advance control rod and the advance piece with gear teeth. The movement of the third gear means is thereby adjusted and the advancement of the film is thereby adjusted. The second gear moving means comprises a reverse control rod and a reverse button secured to the end of the reverse control rod. The reverse button can be utilized by the person to activate the second gear moving means. A reverse piece with gear teeth is secured to the reverse control rod and operates to mesh with the fourth gear means. A reverse adjustment means is operative to adjust the extent of movement of the reverse control rod and the reverse piece with gear teeth. The reverse adjustment means thereby adjusts the movement of the fourth gear means and the reversing of the film. The first gear moving means further comprises an advance spring return means through which said advance control rod extends. The advance spring return means is operative to return the advance control rod to its original position after activation. The second gear moving means further comprises a reverse spring return means through which the reverse control rod extends. The reverse spring return means is operative to return the reverse control rod to its original position after activation. The cartridge comprises a cartridge removal extension with a sloped opening. The cartridge can be removed from the cartridge module by use of an instrument. The cartridge further comprises an advance tension gear, an advance tension spring securing the advance tension gear, a reverse tension gear, a reverse tension spring securing the reverse tension gear, and a plurality of film guides through which the film passes. The film will, therefore, be held properly within the cartridge in the advancing and reversing modes. The cartridge rewind module comprises a spring-wind knob and a first rewind assembly gear means, which is operative to be moved by the spring-wind knob. A rewind spring assembly is alligned with the first rewind assembly gear means. The rewind spring assembly can store energy. A shaft is secured to the rewind spring assembly. A rewind spring locking bar is operative to secure the shaft. Release means is operative to release the rewind spring locking bar thereby allowing the energy stored within the rewind spring assembly to be released by the turning of the shaft. The cartridge rewind module further comprises a second rewind assembly gear means secured to the shaft. When the release means releases the energy from the rewind spring assembly, the shaft rotates, moving the second rewind assembly gear means, which meshes with the second gear means, which is secured to the cartridge. The film in the cartridge is thereby rewound. The release means comprises a rewind spring locking bar, locking gears on the rewind spring locking bar, a rewind spring release activator, and a rewind spring release activator return spring assembly. The locking gears mesh with the second rewind assembly gear means in order to hold the shaft and to keep the energy from releasing. When the rewind spring release activator is activated, the locking gears are removed from the second rewind assembly gear means and the shaft is released.

The invention will be more fully understood from the following detailed description and appended claims when taken with the drawings in which:

Figure 1:
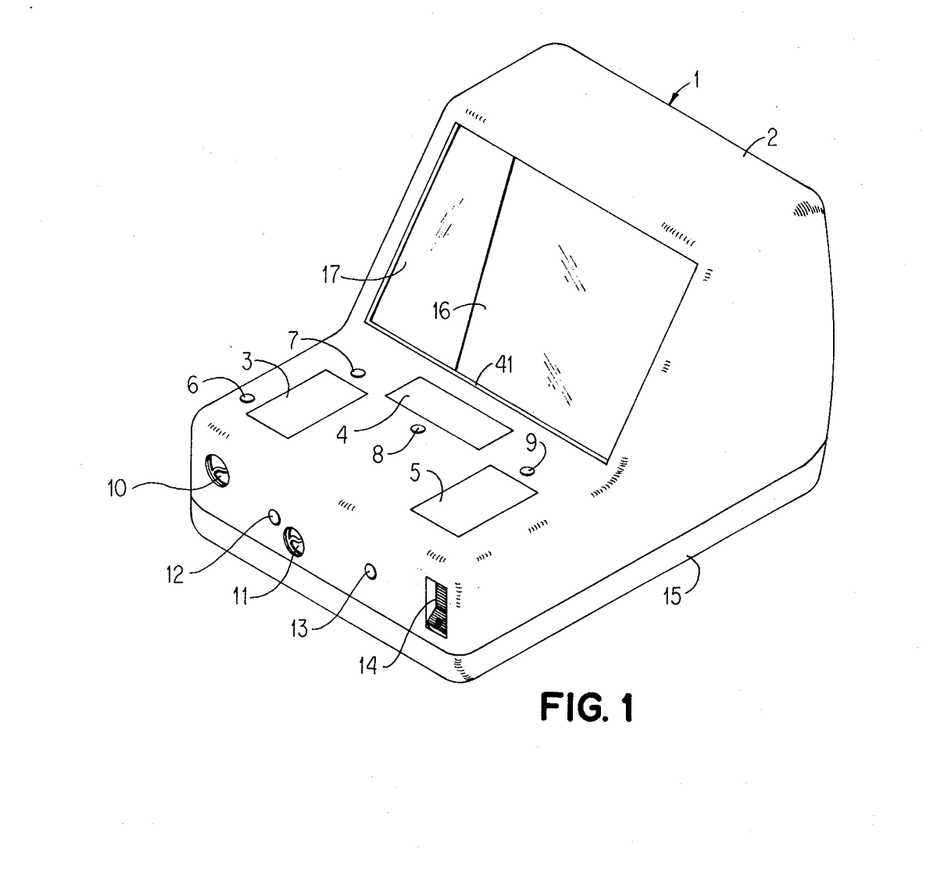
FIG. 1 is an isometric view of the viewer 1.

Referring now to the drawings, FIG. 1 is an isometric view of the viewer 1. Viewer 1 has a upper housing 2. Within upper housing 2 are rewind module lid 3, cartridge module lid 4, and storage module lid 5. Rewind module lid 3 is controlled by rewind module lid release and eject button 7. Cartridge module lid 4 is controlled by cartridge module lid release and eject button 8. Storage module lid 5 is controlled by storage module lid release and eject button 9.

Spring-wind knob 10 is turned to wind a rewind spring assembly 139 within the cartridge rewind module 39. Rewind release button 6 releases the tension on the rewind spring assembly 139 which is wound by spring-wind knob 10.

Focus push-pull knob 11 is of similar design of the spring-wind knob 10. However, the focus push-pull knob 11 is used as in a push-pull mode while the spring-wind knob 10 is turned to a circular motion.

Reframe button 12 and frame button 13 extend into the cartridge module 37. The frame button 13 is utilized to advance film in cartridge 50. The reframe button 12 is utilized to reverse film in cartridge 50.

The viewer 1 has a power switch 14. Upper housing 2 is secured onto lower housing 15. The viewer 1 has a viewing screen 16.

Figure 2:
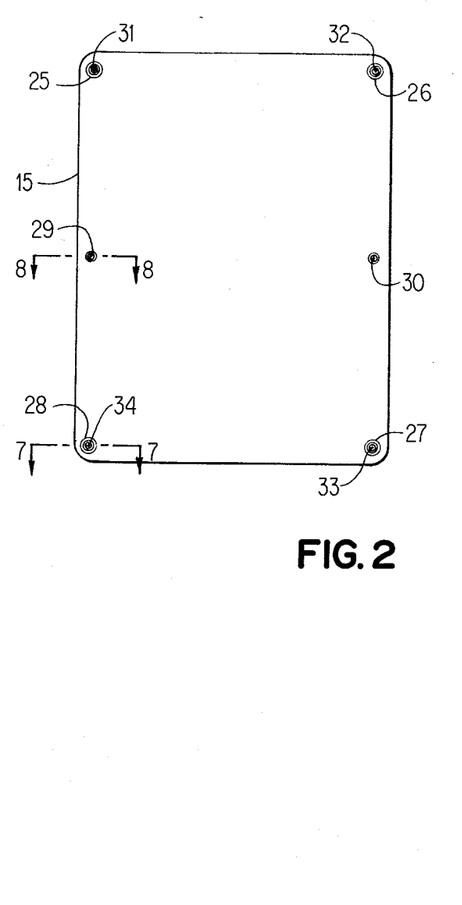
FIG. 2 is a bottom view of the viewer 1 showing the attachment means for the bottom cover, lower housing 15.

FIG. 2 is a bottom view of the viewer 1. Through the lower housing 15 are a plurality of support means. Leg supports 25, 26, 27, and 28 are shown in lower housing 15. Screw 31 secures leg support 25 to lower housing 15. Screw 32 secures leg support 26 to lower housing 15. Screw 33 secures leg support 27 to lower housing 15. Screw 34 secures leg support 28 to lower housing 15. Additional supports are screw support 29 and screw support 30.

Figure 3:
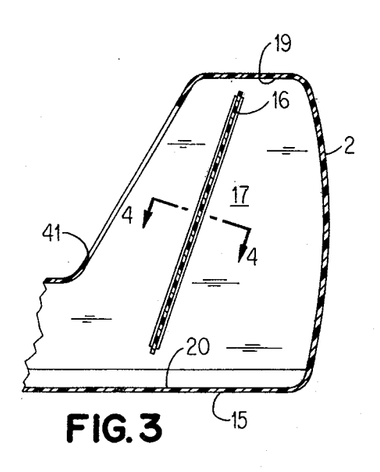
FIG. 3 is a partial sectional view of viewer 1 showing the viewing screen 16.

FIG. 3 is a partial sectional view of the viewer 1 showing the arrangement of the viewing screen 16. As seen from the viewing side, the upper housing 2 has a left inside wall 17 and a right inside wall 18 (shown in FIG. 9).

The upper housing 2 has an upper inside surface 19 and a lower inside surface 20. The lower inside surface 20 may be the same as the inside surface of lower housing 15.

Figure 4:
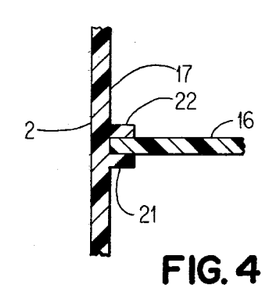
FIG. 4 is a sectional view taken at section 4—4 of FIG. 3.
Figure 9:
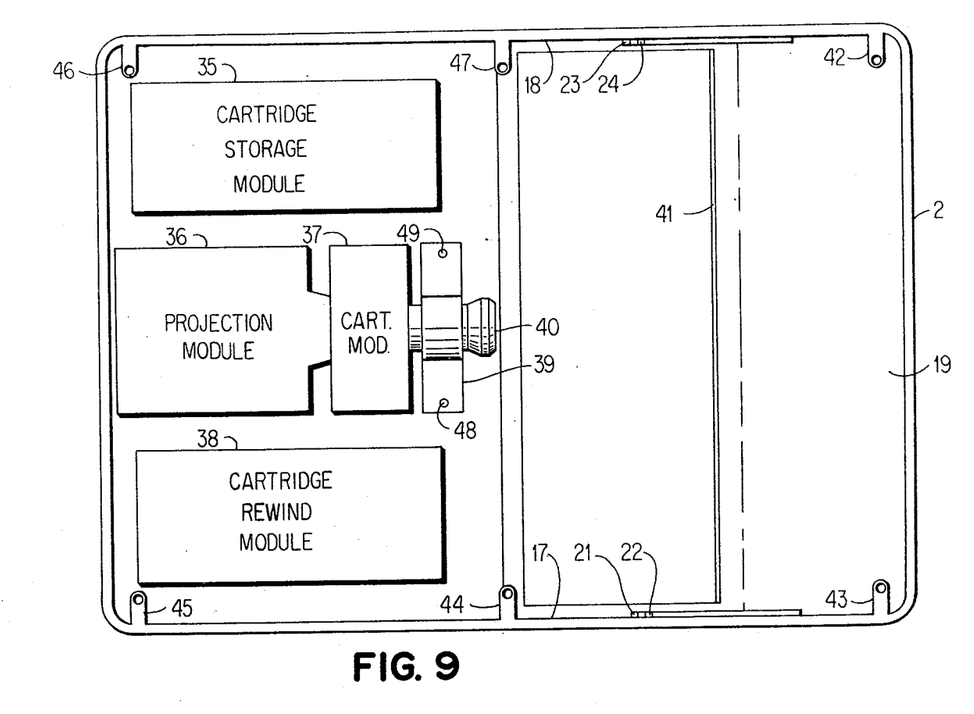
FIG. 9 is a bottom view with the lower housing 15 removed showing various viewer sections modually.

FIG. 4 is a sectional view taken at section 4—4 of FIG. 3. Viewing screen 16 is secured within the viewer 1. Left front screen guide 21 and left rear screen guide 22 secure one end of the viewing screen 16. Screen guides 21 and 22 are secured to left inside wall 17. Right front screen guide 23 and right rear screen guide 24 are connected to right inside wall 18, as shown in FIG. 9, to secure the other end of the viewing screen 16.

Figure 5:
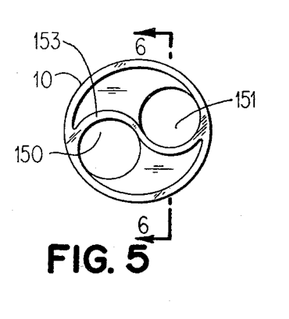
FIG. 5 is an elevation view of the spring-wind knob 10.

FIG. 5 is an elevation view of the spring-wind knob 10. Spring-wind knob 10 has an instrument recess 150 and an instrument recess 151. Between instrument recess 150 and instrument recess 151 is a curved separator 153.

Figure 6:
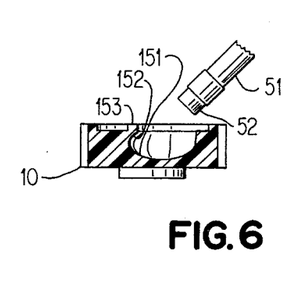
FIG. 6 is a sectional view taken at section 6—6 of FIG. 5.

FIG. 6 is a sectional view of FIG. 5 taken at section 6—6. Instrument recess 151 has an undercut ledge 152 extending under the curved separator 153. Instrument 51 with instrument tip 52 are shown exploded from spring-wind knob 10. A handicapped person or one who might have difficulty with an ordinary knob can utilize the instrument 51 with the instrument tip 52 by placing the instrument tip 52 within instrument recess 151 and against the undercut ledge 152 to move the spring-wind knob 10 in the circular direction needed. Instrument recess 150 has a similar undercut ledge (not shown) which can be utilized for the same purpose. The same design knob as spring-wind knob 10 can be utilized for other purposes such as focus push-pull knob 11 in which the instrument tip 52 would be utilized against the undercut ledge 152 to push or pull the knob.

Figure 7:
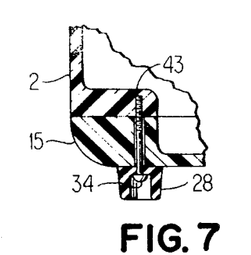
FIG. 7 is a partial sectional view taken at section 7—7 of FIG. 2.

FIG. 7 is a partial sectional view taken at section 7—7 of FIG. 2. This figure illustrates one method of mounting the leg support in order to connect the upper housing 2 to the lower housing 15. Screw 34 is shown extending through leg support 28, through lower housing 15 and being secured within upper housing 2.

Figure 8:
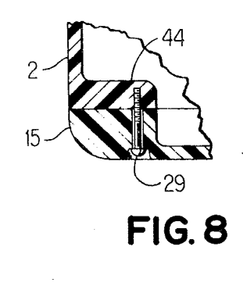
FIG. 8 is a partial sectional view taken at section 8—8 of FIG. 2 showing the lower housing 15 attachment means.

FIG. 8 is a partial sectional view taken at section 8—8 of FIG. 2. Screw support 29 is shown extending through lower housing 15 and being secured within upper housing 2. Any number of screw supports can be utilized. Any number of leg supports may be utilized. The upper housing 2 may be secured to the lower housing 15 by other securing means if desired.

FIG. 9 is a bottom view of the viewer 1 with the upper housing 2 removed. Various viewer sections are shown modually. The cartridge storage module 35 and the cartridge rewind module 38 are independent of the projection system. The projection system includes the projection module 36, the cartridge module 37, the lens support 39, and the lens 40. Lens 40 extends from cartridge module 37 through lens support 39. The lens 40 projects the desired images below viewing opening 41 on to viewing screen 16 (not shown in FIG. 9). In FIG. 9 the viewing screen 16 has been removed.

Extending from the upper housing 2 are mounting extensions 42, 43, 44, 45, 46, and 47. Screw 33 extends into mounting extension 42. Screw 34 extends into mounting extension 43. Screw 29 extends into mounting extension 44. Screw 31 extends into mounting extension 45. Screw 32 extends into mounting extension 46. Screw 30 extends into mounting extension 47.

The lens support 39 is supported by lens support mounting screw 48 and 49.

Figure 10:
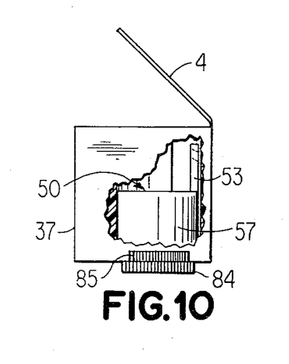
FIG. 10 is a side elevation view of the cartridge module 37, shown in FIG. 9, with a cutaway view showing the film cartridge 50 within.

FIG. 10 is a side elevation view of the cartridge module 37, shown in FIG. 9, with a cutaway view showing the cartridge 50 within.

Figure 11:
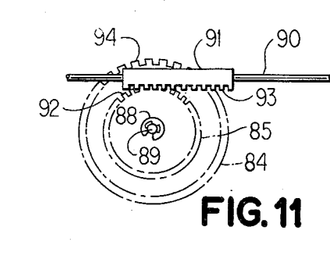
FIG. 11 is a top view of the advance mechanism in the cartridge module 37.

FIG. 11 is a top view of the advance mechanism in the cartridge module 37.

Figure 12:
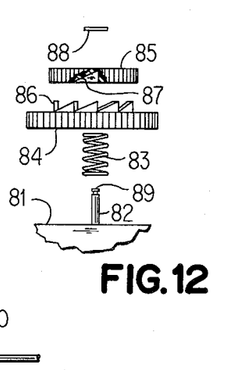
FIG. 12 is an exploded elevation view of the advance mechanism in FIG. 11.

FIG. 12 is an exploded elevation view of the advance mechanism in FIG. 11. Control rod 90 has a straight portion 91 with gear teeth 93. Gear teeth 93 mesh with gear teeth 92 on activating gear 85. Gear teeth 94 on cartridge meshing gear 84 mesh with gear 59 on the cartridge 50.

Extending from gear support member 81 is gear shaft 82. Gear tension spring 83 fits over gear shaft 82 and against gear support member 81 and cartridge meshing gear 84. Sloped advancing teeth 86 protrude from gear 84. Gear 85 has a plurality of sloped indentations 87. When gear 85 is turned counter-clockwise, gear 84 will turn. When gear 85 is turned clockwise, gear 84 will not turn. Therefore, when control rod 90 is extended forward, the result will be that gear 85 will turn gear 84 and gear 84 will turn gear 59 in order to adjust the advance framing of the film 63 in cartridge 50. A similar mechanism such as is shown in FIGS. 11 and 12 is utilized when control rod 101 is pushed for use in adjusting the reverse framing of film 63 in cartridge 50.

In FIGS. 11 and 12 it is noted that a retaining clip 88 secures the advance mechanism assembly together by securing to end 39 of shaft 32.

Figure 13:
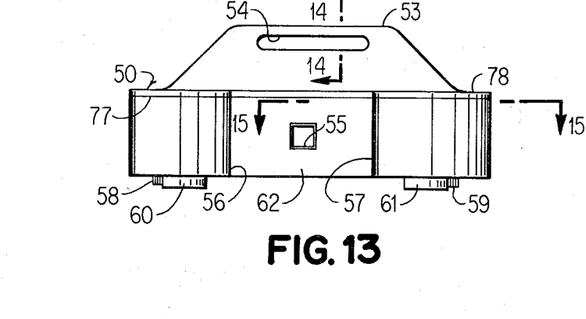
FIG. 13 is an elevation view of the film cartridge 50 which fits into the cartridge module 37, the catridge storage module 35, or the cartridge rewind module 38.

FIG. 13 is an elevation view of the film cartridge 50. Film cartridge 50 fits into cartridge module 37, the cartridge storage module 35, or the cartridge rewind module 38.

Figure 14:
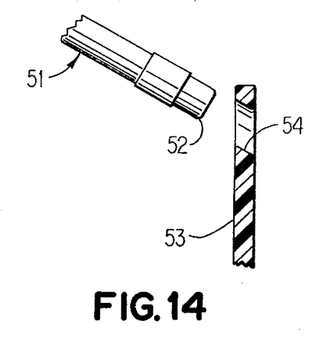
FIG. 14 is a partial sectional view of FIG. 13 taken at section 14—14.

FIG. 14 is a partial sectional view taken at section 14—14 of FIG. 13. FIG. 14 shows that cartridge removal extension 53 has a sloped opening 54. An instrument 51 with instrument tip 52 can be utilized to remove the cartridge 50 from the cartridge module 37, the cartridge storage module 35, or the cartridge rewind module 38. This removal can be accomplished by a person with a physical handicap or by a person without a physical handicap.

Figure 15:
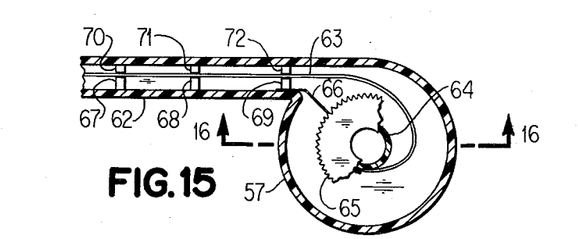
FIG. 15 is a partial sectional view taken at section 15—15 of FIG. 13.

FIG. 15 is a partial sectional view taken at section 15—15 of FIG. 13.

Figure 16:
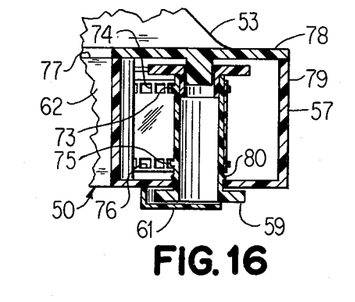
FIG. 16 is a partial sectional view taken at section 16—16 of FIG. 15.

FIG. 16 is a partial sectional view taken at section 16—16 of FIG. 15.

Cartridge 50 has an open passageway 55 for light to pass through the cartridge 50. The film 63 extends across the open passageway 55 and the film images are projected there through.

Cartridge 50 has a left film spool housing 56 and a right film spool housing 57. Film reframe gear 58 controls a reverse adjustment of the film 63. Film frame gear 59 controls the advance movement of the film 63. Film reframe gear 58 has a partial gear housing 60. Film frame gear 59 has a partial gear housing 61.

Cartridge 50 has a center portion 62. Right film spool housing 57 has a spool 64. Attached to spool 64 is tension gear 65 with a tension spring 66. Left film spool housing 56 has a spool, a tension gear, and a tension spring all not shown but similar to those shown in right film spool housing 57.

The film 63 is secured on to the spool 64 and the left spool (not shown). The film 63 is shown with no tension on it for viewing purposes. The film 63 extends through a plurality of film guides to properly guide the film across the open passageway 55. Some of the pairs of film guides shown are front film guide 67 and rear film guide 70, front film guide 68 and rear film guide 71, and front film guide 69 and rear film guide 72. The film 63 passes through the plurality of front and rear film guides.

Spool 64 has a plurality of upper tabs 73 and lower tabs 75 for use in advancing film 63. Film 63 has a plurality of upper openings 74 and lower openings 76 for use in advancing the film 63. When the film 63 is advanced, upper tabs 73 extend into upper openings 74 and lower tabs 75 extend into lower tabs 76 in order to advance the film 63 and to wind it around spool 64.

Cartridge 50 has a sealing point 77 where the upper portion 78 of cartridge 50 is sealed to the lower portion 79 of cartridge 50. One or more locking rings 80 are utilized in securing spool 64 within cartridge 50. A similar mechanism assembly is located within left film spool housing 56 as is in right film spool housing 57.

Tension spring 66 acts to apply pressure against tension gear 65 which is secured to spool 64. This tension enables the film 63 to be tightly wound around spool 64 without the danger of slippage which could cause problems in viewing the film 63.

Figure 17:
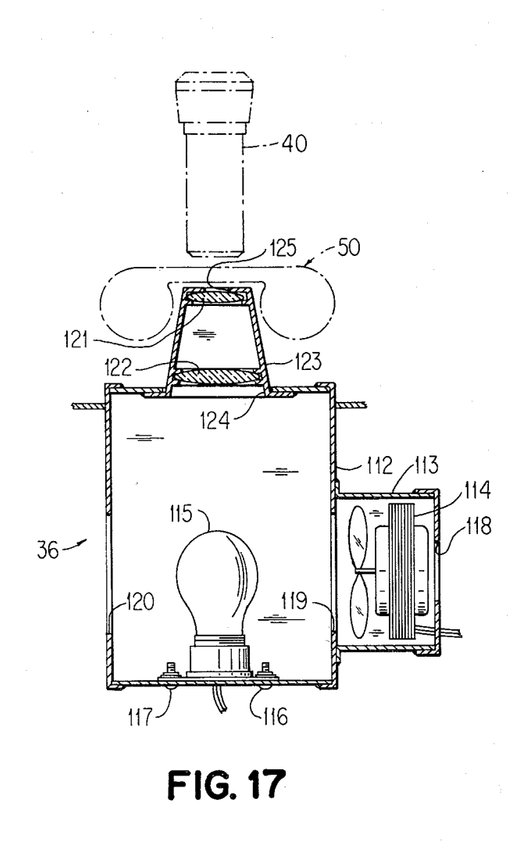
FIG. 17 is a sectional view through the projection module 36 showing the positional relationships including the cartridge 50 and the lens 40.

FIG. 17 is a sectional view through the projection module 36. The projection module 36 has a projection housing 112. Attached to the projection module 36 is a projection light cooling fan housing 113 which contains a projection light cooling fan 114. Air is blown through the projection light cooling fan 114 through air-flow opening 118 in projection light cooling fan housing 113 and air-flow opening 119 in projection housing 112. The air blows past the projection light 115 removing heat and the air is blown out through air flow opening 120 in projection housing 112. Projection light 115 is secured to projection housing 112 by mounting screws 116 and 117. The light from the projection light 115 extends through opening 124 and the front of projection housing 112. The light then passes through rear focusing lens 122, front focusing lens 121, and through opening 125 in the front of focusing lens housing 123. The light then passes through the cartridge 50 carrying the film images from cartridge 50 to lens 40 which projects the images. Front focusing lens 121 and rear focusing lens 122 are located within focusing lens housing 123.

Figure 18:
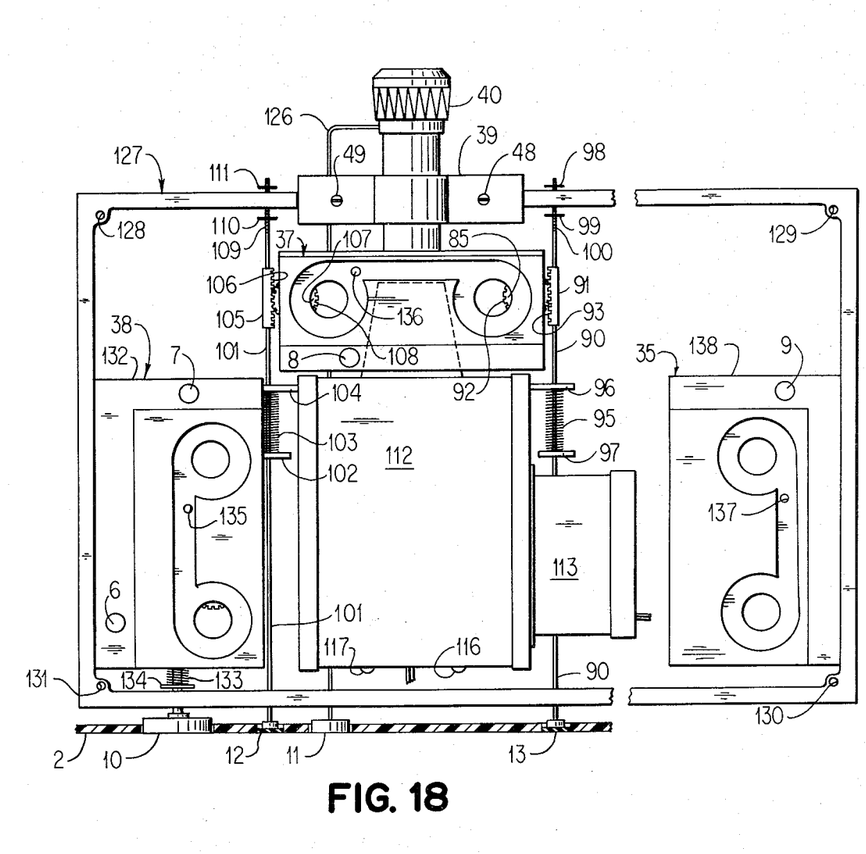
FIG. 18 is a top view of the viewer 1 with the upper housing 2 removed.

FIG. 18 is a top view of the viewer 1 with upper housing 2 removed.

To operate the viewer 1, a cartridge 50 would be placed into the cartridge module 37. To advance the film in the cartridge module 37, control rod 90 is pressed forward by pressing frame button 13.

Bearing shoulder 97 on rod 90 presses against return spring 95 which presses against front support bearing 96. The straight portion 91 of control rod 90 has gear teeth 93 which mesh with a gear system which advances the film within the cartridge. Rod 90 has a threaded portion 100 near its end on which a rear retaining adjustment screw 99 is secured. The rear retaining adjustment screw can be adjusted to regulate the extension distance of rod 90 and thereby to act as a fine adjustment for the movement of straight portion 91 which controls the fine adjustment for the advancement of the film in the cartridge. After the rod 90 is pushed and the film advanced, the return spring 95 returns the rod 90 to its original position. Retaining clip 98 prevents the rod 90 from coming back through the internal subhousing 127.

To reverse the film in the cartridge module 37, control rod 101 is pressed forward by pressing frame button 12. Bearing shoulder 102 on rod 101 presses against return spring 103 which presses against front support bearing 104. The straight portion 105 of control rod 101 has gear teeth 106 which mesh with a gear system which reverses the film within the cartridge. Rod 101 has a threaded portion 109 near its end on which a rear retaining adjustment screw 110 is secured. The rear retaining screw 110 can be adjusted to regulate the extension distance of rod 101 and thereby to act as a fine adjustment for the movement of straight portion 105 which controls fine adjustment for the reversing of the film in the cartridge. After the rod 101 is pushed and the film is reversed, the return spring 103 returns the rod 101 to its original position. Retaining clip 111 prevents the rod 101 from coming back through the internal subhousing 127.

In the advance side, the activating gear 85 with teeth 92 actually turn the gears on the cartridge 50. On the rewind side, activating gear 107 with teeth 108 actually turn the gears on the cartridge 50.

FIG. 18 shows the focus control rod 126, which is controlled by focus push-pull knob 11.

Internal subhousing 127 is secured to upper housing 2 through a plurality of mounting openings such as mounting openings 128, 129, 130, and 131. The cartridge rewind module 38 is controlled by the spring-wind knob 10. Knob 10 is pushed in to engage rewind spring assembly 139.

Cartridge rewind module 38 has a rewind housing 132. Return spring 133 with bearing clip 134 act to return spring-wind knob 10 to its original position after it has wound the rewind spring assembly 139.

Cartridge rewind module 38 has an eject rod 135 which is activated by rewind module lid release and eject button 7. Cartridge module 37 has an eject rod 136 which is controlled by cartridge module lid and release and eject button 8. Cartridge storage module 35 has an eject rod 137 which is controlled by storage module lid release and eject button 9.

Cartridge storage module 35 has a cartridge storage housing 138.

Figure 19:
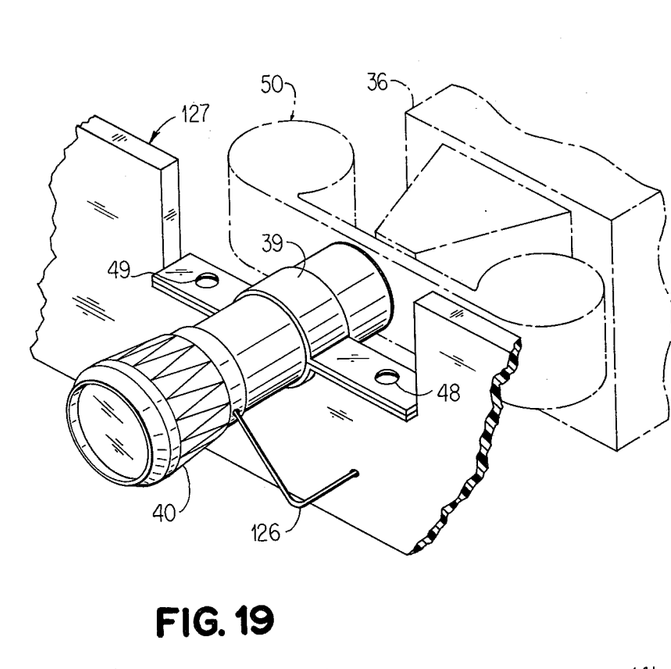
FIG. 19 is a partial isometric view of the lens arrangement showing positional relationships of the cartridge 50, the lens 40, and the projection module 36.

FIG. 19 is a partial isometric view of the lens arrangement for lens 40. Lens 40 is secured by lens support 39, which is secured to internal subhousing 127 by lens support mounting screws 48 and 49.

Light passes through projection module 36 and through cartridge 50 thereby projected onto viewing screen 16 by lens 40. Focusing of lens 40 is controlled by the focus control rod 126.

Figure 20:
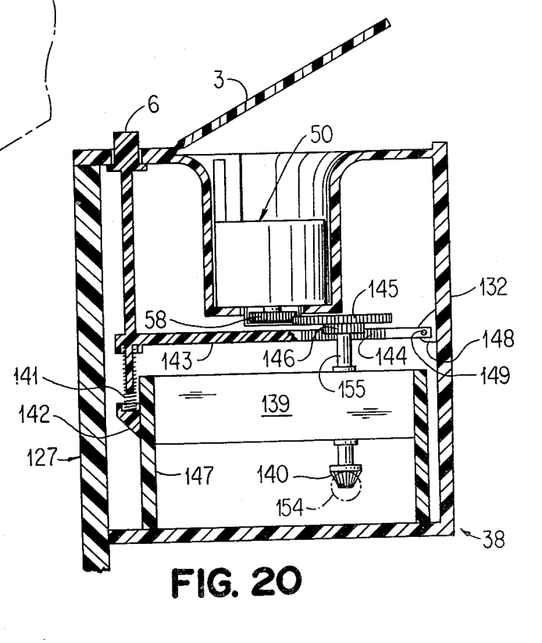
FIG. 20 is a sectional view of the cartridge rewind module 38.

FIG. 20 is a sectional view of the cartridge rewind module 38. Connected to the spring-wind knob 10 of the cartridge rewind module 38 is a beveled gear 154. When the spring-wind knob 10 is pressed forward, the beveled gear meshes with the rewind spring assembly activator gear 140.

When the rewind spring assembly activator gear 140 is rotated, the rewind spring assembly 139 is activated. The stored energy within rewind spring assembly 139 is released when rewind spring release button 6 is pressed. When rewind spring release button 6 is pressed, the rewind spring locking bar 143 is moved downward. Before that downward movement, the rewind spring locking bar gear teeth 144 pressed against the spring ratchet gear assembly lower gear 146, thereby securing the shaft 155 from releasing the tension in rewind spring assembly 139. When gear teeth 144 move downward from gear 146, shaft 155 is free to turn and release the tension within rewind spring assembly 139. This movement causes the turning of spring ratchet gear assembly upper gear 145, which meshes with film reframe gear 58 on cartridge 50 and rewinds the film in cartridge 50.

The rewind spring release button 6 is returned to its original position by the release of the outside pressure on the button 6 and the uncoiling of the rewind spring release button return spring 141. When button 6 is pressed, spring 141 is coiled against the return spring base 142. Return spring base 142 is secured to one of the rewind spring assembly supports 147. Return spring locking bar 143 pivots on anchor plate 148, which is secured to the rewind housing 132. Pivot pin 149 secures the end of rewind spring locking bar 143 to anchor plate 148.

The viewer 1 has several sections which work independently. The projections of the film images is completely independent of the function of the cartridge storage module 35 and the cartridge rewind module 38.

The design of viewer 1 is such that it can be operated by a person who is physically handicapped. All of the buttons can be activated by the simple use of an instrument which can be attached to a portion of the body other than the normal hand.

The cartridges can be removed or placed into position by the use of a similar instrument. The cartridges can even be rewound in the cartridge rewind module 38 by the same physically disabled person.

The cartridge storage module can be designed to store a plurality of cartridges as is desired by the designer.

While fine adjustments have been provided for the framing and reframing functions of the projection system, other fine adjustment techniques could also be utilized.

The cartridge 50 can be designed to include other techniques utilized in other cartridge design and manufacture. Different gear systems can be utilized to provide the functions herein. A plurality of different light systems or lens systems can be utilized within the present invention.

The viewing screen 16 can be supported in a variety of ways. The knobs can be designed so that the functions of being capable of utilization by a handicapped person is maintained.

Different types of housings or securing means, tension means, cooling means, gear systems, mounting means, cartridge means, or adjusting means can be utilized within the scope of the invention.

This invention meets all of the objects of the invention. A unique viewer is provided which has a projection system, a storage system, and a rewind system. Film cartridges are utilized thereby conserving paper and requiring a smaller storage area.

The film images are focused on a screen within the viewer at a distance sufficient that the viewing image of a written book or other written material will be larger than the ordinary book print.

The viewer may be constructed of durable, inexpensive, easily maintained, portable, and easily molded parts.

The viewer can be easily utilized by invalids or children. A variety of cartridge films for many purposes can be studied and enjoyed with the present system. With the unique and easy method of framing and reframing the cartridge, pages of a book being read can be easily turned or reviewed. The enjoyment of reading can be returned to those who have been disabled without the requirement of constant care. The enjoyment of reading can be reintroduced to a new generation of children.

While the invention has been described with reference to the specific embodiments, the description is illustrative and is not to be construed as limiting the scope of the invention. Various modifications and changes may occur to those skilled in the art without departing from the spirit and scope of the invention as defined by the appended claims.

I claim:

1. A device for use by a person for viewing material on a film comprising:
   (a) a viewing screen secured within said device;
   (b) a projection module secured within said device;
   (c) a cartridge containing film;
   (d) a cartridge module operable to hold said cartridge, optically aligned with said projection module, and secured to said device;
   (e) lens means secured to said device, optically aligned with said projection module and said cartridge module, and operable to focus said material directly onto said viewing screen;
   (f) first toothed gear means secured to said cartridge operative when moved to advance said film in said cartridge a pre-determined distance;
   (g) second toothed gear means secured to said cartridge operative when moved to reverse said film in said cartridge a pre-determined distance;
   (h) third toothed gear means secured within said cartridge module and extending through an end of said cartridge module, operative when moved to mesh with said first toothed gear means thereby advancing said film;
   (i) fourth toothed gear means secured within said cartridge module and extending through the other end of said cartridge module, operative when moved to mesh with said second toothed gear means thereby reversing said film in said cartridge;
   (j) first gear moving means positioned within said device, operative to move said third toothed gear means, thereby advancing said film a pre-determined distance, when activated by said person;
   (k) second gear moving means positioned within said device, operative to move said fourth toothed gear means, thereby reversing said film a pre-determined distance, when activated by said person; and
   (l) a cartridge rewind module secured within said device and operative to rewind said film in said cartridge, said cartridge rewind module comprising:
   (1) a spring-wind knob;
   (2) first rewind assembly gear means operative to be moved by said spring-wind knob;
   (3) a rewind spring assembly aligned with said first rewind assembly gear means and operative to store energy within said rewind spring assembly;
   (4) a shaft secured to said rewind spring assembly;
   (5) a rewind spring locking bar operative to secure said shaft;
   (6) release means operative to release said rewind spring locking bar thereby allowing said energy stored within said rewind spring assembly to be released by the turning of said shaft; and
   (7) a second rewind assembly gear means secured to said shaft whereby when said release means releases said energy from said rewind spring assembly, said shaft rotates moving said second rewind assembly gear means which meshes with said second gear means which is secured to said cartridge thereby rewinding said film in said cartridge.

2. A device according to claim 1 further comprising a cartridge storage module secured within said device and operative to store said cartridge or similar cartridges when not in use.

3. A device according to claim 1 wherein said first gear moving means comprises:
   (a) an advance control rod aligned parallel to the end of said cartridge module that has said third toothed gear means extending therethrough;
   (b) an advance button secured to the end of said advance control rod which can be utilized by said person to activate said first gear moving means;
   (c) an advance piece with gear teeth secured onto said advance control rod and operative to mesh with said third toothed gear means; and
   (d) advance adjustment means operative to adjust the extent of movement of said advance control rod and said advance piece with gear teeth, thereby adjusting the movement of said third toothed gear means and the advancement of said film a pre-determined distance.

4. A device according to claim 1 wherein said second gear moving means comprises:
   (a) a reverse control rod aligned parallel to the end of said cartridge module that has said fourth toothed gear means extending therethrough;
   (b) a reverse button secured to the end of said reverse control rod which can be utilized by said person to activate said second gear moving means;
   (c) a reverse piece with gear teeth secured onto said reverse control rod and operative to mesh with said fourth toothed gear means; and
   (d) reverse adjustment means operative to adjust the extent of movement of said reverse control rod and said reverse piece with gear teeth, thereby adjusting the movement of said fourth toothed gear means and the reversing of said film a predetermined distance.

5. A device according to claim 3 wherein said second gear moving means comprises:
(a) a reverse control rod aligned parallel to the end of said cartridge module that has said fourth toothed gear means extending therethrough;
(b) a reverse button secured to the end of said reverse control rod which can be utilized by said person to activate said second toothed gear moving means;
(c) a reverse piece wih gear teeth secured onto said reverse control rod and operative to mesh with said fourth toothed gear means; and
(d) reverse adjustment means operative to adjust the extent of movement of said reverse control rod and said reverse piece with gear teeth, thereby adjusting the movement of said fourth toothed gear means and the reversing of said film.

6. A device according to claim 5 wherein said first gear moving means further comprises an advance spring return means through which said advance control rod extends, operative to return said advance control rod to its original position after activation.

7. A device according to claim 6 wherein said second gear moving means further comprises a reverse spring return means through which said reverse control rod extends, operative to return said reverse control rod to its original position after activation.

8. A device according to claim 1 wherein said cartridge comprises a cartridge removal extension with a sloped opening whereby said cartridge can be removed from said cartridge module by use of an instrument.

9. A device according to claim 8 wherein said cartridge further comprises an advance tension gear, an advance tension spring securing said advance tension gear, a reverse tension gear, a reverse tension spring securing said reverse tension gear, and a plurality of film guides through which said film passes whereby said film will be held properly within said cartridge in the advancing and reversing modes for proper viewing.

10. A device according to claim 1 wherein said release means comprises locking gears on said rewind spring locking bar, a rewind spring release activator and a rewind spring release activator return spring assembly whereby said locking gears mesh with said second rewind assembly gear means in order to hold said shaft and to keep said energy from releasing, and when said rewind spring release activator is activated, said locking gears are removed from said second rewind assembly gear means thereby releasing said shaft.

* * * * *